Jan. 9, 1951 L. A. COLLIS 2,537,120
SHAFT COUPLER
Filed April 27, 1948
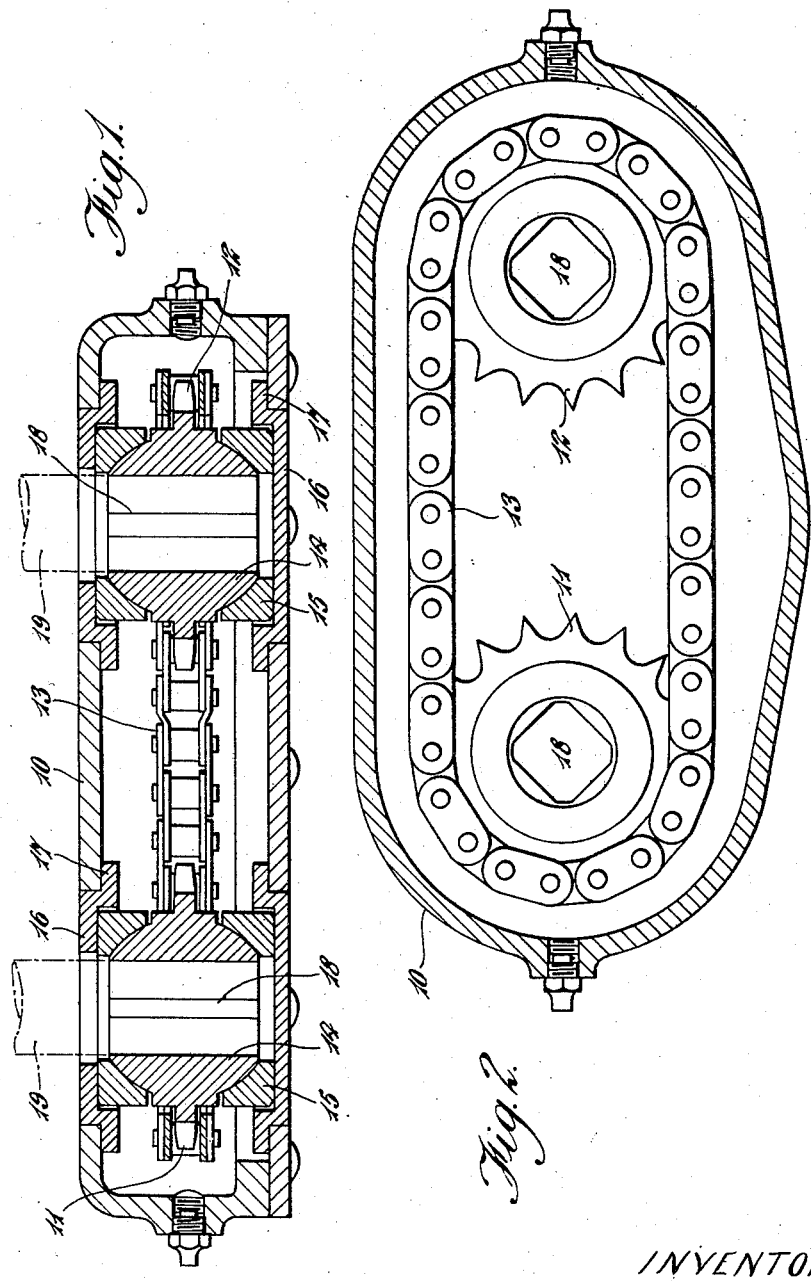
INVENTOR:
LESLIE ALFRED COLLIS
by Richardson, David and Nordon
Att'ys Patented Jan. 9, 1951

2,537,120

UNITED STATES PATENT OFFICE 2,537,120

SHAFT COUPLER

Leslie Alfred Collis, Radlett, England, assignor to J. Collis & Sons Limited, London, England, a British company Application April 27, 1948, Serial No. 23,439
In Great Britain April 30, 1947

2 Claims. (Cl. 74—216.5)

This invention relates to couplers for coupling together two shafts or spindles and more particularly for coupling together the spindles of the end rollers of conveyor units of the kind described in co-pending application Serial No. 741,490, filed April 15, 1947.

In co-pending patent application Serial No. 741,490 there is described and claimed a belt conveyor which is made up of a number of conveyor units each comprising a frame within which the conveyor belt is mounted in the usual way, on, at least, end rollers, the spindles of which run in bearings on the outside of the frame, the bearings at the ends of two consecutive units being carried by cradles whereby they are spaced at a predetermined distance apart and the spindles being coupled together by means of a removable self-contained coupling unit engaging therewith. Now it will be appreciated that where the coupling unit comprises a pair of sprockets adapted to rotate on fixed axes the satisfactory installation and operation of such a conveyor is dependant upon the correct location of the spindles of the juxtaposed units in order that they may be coupled together by the self-contained coupling unit. A comparatively high standard of precision manufacture is called for any substantial mis-alignment of the units of the conveyor prevents its installation and operation. The chief object of the present invention is to provide an improved form of coupler which will overcome these possible disadvantages of the construction of conveyor described in the said co-pending patent application whilst still retaining the advantages of the unit system.

The coupler according to the present invention comprises a casing in which the two sprockets or the like are carried in ball and socket mountings so that they are free to move slightly in order to adjust themselves to any slight mis-alignment or inaccuracies in manufacture of the spindles which they are intended to couple together.

Preferably the sockets of the ball and socket mountings are capable of a slight movement towards and away from one another within the casing in order that the sprockets or the like may adjust themselves to slight variations in the spacing of the spindles to be coupled together.

In order that this invention may be the more clearly understood and readily carried into effect reference may be made to the accompanying drawings which illustrate by way of example, the preferred embodiment of this invention and in which:

Figure 1 is a longitudinal horizontal section through the coupler, and

Figure 2 is a longitudinal vertical section through the same.

Referring now to the accompanying drawings the coupler therein illustrated comprises a casing 10 which houses two sprockets 11, 12 coupled together by means of a chain 13. The sprockets are carried by the ball elements 14 of ball and socket mountings 14, 15 and the socket elements 15 are so mounted within the casing that they are free to move towards and away from each other slightly. Thus, for example, they may be held within the casing between dished plates 16 in the casing 10, the flanges 17 being on the inside and the dished part being larger than the sockets to permit the desired small amount of movement. Only the rear wall of the casing is apertured to allow passage of the spindles, the front of the casing being plain so that there are no moving parts exposed.

The sprockets 11, 12 are provided with square or other non-circular bores 18 to take about the projecting spindles 19 which are to be coupled together, the casing being apertured to allow the passage of the spindles preferably at the rear only as explained above.

By this means the sprockets will automatically adjust themselves to any slight mis-alignment of the spindles or to any inaccuracies in the manufacture of the conveyor units or the cradle or the like supporting the same.

Of course, if desired, the coupler sprockets may be provided with projecting square or other non-circular spindles adapted to take into corresponding recesses in the end rollers of the conveyor units.

In a modified form of the present invention the sprocket and chair drive within the coupler casing is replaced by belt, friction, gearing or any other suitable form of drive the appropriate parts being carried in ball and socket mountings in a like manner to the sprockets.

Although the coupler according to the present invention is more applicable to the coupling together of conveyor units as described in co-pending patent application Serial No. 741,490 it will be appreciated that it is not limited to this particular use but is generally applicable to the coupling together of any two shafts or the like located at a predetermined distance apart.

I claim:

1. A bearing for shaft coupling apparatus comprising a casing having spaced, aligned openings on opposite walls thereof for receiving a plurality of shafts to be coupled together, a flanged cup member seated in each of said openings, the flange of said cup member extending around the periphery of the casing opening interiorly thereof, said cup member lying substantially flush with the casing wall on the exterior thereof, a ring having a bearing surface seated in each of said cup members, and a bearing member seated in said rings between said aligned openings, said bearing member having a socket for receiving a shaft to be coupled, each of said rings having an external diameter smaller than the internal diameter of the cup member in which it is seated to allow some movement of said ring with respect to said cup member for alignment purposes.

2. A bearing according to claim 1 in which each bearing member has an integrally formed sprocket for forming a chain drive connection between the shafts to be coupled.

LESLIE ALFRED COLLIS.

REFERENCES CITED

The following references are of record in the file of this patent:

UNITED STATES PATENTS

| Number | Name | Date |
| --- | --- | --- |
| 558,262 | Darling | Apr. 14, 1896 |
| 844,892 | Pfander | Feb. 19, 1907 |
| 930,531 | Chadwick | Aug. 10, 1909 |
| 1,049,660 | Breed | Jan. 7, 1913 |